(12) United States Patent
Li (10) Patent No.: US 11,394,291 B2
(45) Date of Patent: Jul. 19, 2022

(54) RIPPLE VOLTAGE CONTROL CIRCUIT AND CONTROL METHOD THEREOF

(71) Applicant: Silergy Semiconductor Technology (Hangzhou) LTD, Hangzhou (CN)

(72) Inventor: Guowang Li, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/223,180

(22) Filed: Apr. 6, 2021

(65) Prior Publication Data
US 2021/0320582 A1    Oct. 14, 2021

(30) Foreign Application Priority Data
Apr. 13, 2020  (CN) .......................... 202010284553.X (51) Int. Cl.
| H02M 1/14 | (2006.01) |
| H02M 3/156 | (2006.01) |
| H02M 1/15 | (2006.01) |
| H02M 3/157 | (2006.01) |
| H02M 3/158 | (2006.01) |

(52) U.S. Cl.
CPC ............. *H02M 1/15* (2013.01); *H02M 1/143* (2013.01); *H02M 3/157* (2013.01)

(58) Field of Classification Search
CPC ............ H02M 1/14; H02M 1/43; H02M 1/15; H02M 3/156; H02M 3/158; H02M 1/0025
See application file for complete search history.

(56) References Cited

U.S. PATENT DOCUMENTS

| 7,227,277 | B2 | 6/2007 | Chapman et al. |
| 7,256,568 | B2 | 8/2007 | Lam et al. |
| 8,310,846 | B2 | 11/2012 | Piazzesi |
| 8,853,888 | B2 | 10/2014 | Khaligh |
| 8,896,284 | B2 * | 11/2014 | Fan ..................... H02M 3/1563 323/285 |
| 9,130,460 | B2 | 9/2015 | Sun et al. |
| 9,257,916 | B2 | 2/2016 | Cheng et al. |
| 9,543,822 | B2 | 1/2017 | Hang et al. |
| 9,559,591 | B2 | 1/2017 | Hang et al. |
| 9,755,521 | B2 * | 9/2017 | Cai .......................... H02M 1/14 |
| 2007/0052397 | A1 | 3/2007 | Thompson et al. |
| 2008/0231115 | A1 | 9/2008 | Cho et al. |
| 2008/0258688 | A1 | 10/2008 | Hussain et al. |
| 2012/0153729 | A1 | 6/2012 | Song et al. |
| 2013/0063180 | A1 | 3/2013 | Sun et al. |

(Continued)

*Primary Examiner* — Gary L Laxton (57) ABSTRACT

A ripple voltage control circuit for controlling a switching converter, including: a control circuit configured to superimpose a compensation voltage and a ripple voltage on a feedback voltage that represents an output voltage of the switching converter, in order to generate a ripple signal; the control circuit being configured to superimpose a bias voltage on a reference voltage that represents a desired output voltage of the switching converter as a reference signal, and to compare the ripple signal against the reference signal in order to generate a turn-on signal for a main power switch of the switching converter; and where the compensation voltage adaptively varies with a duty cycle of the main power switch, such that the ripple signal is independent of the duty cycle, in order to maintain the feedback voltage as equal to the reference voltage.

18 Claims, 9 Drawing Sheets

(56) References Cited

U.S. PATENT DOCUMENTS

| | | |
|---|---|---|
| 2015/0078045 A1 | 3/2015 | Zhang et al. |
| 2016/0211745 A1 | 7/2016 | Hang et al. |
| 2016/0261198 A1* | 9/2016 | Li .................... H02M 3/33507 |
| 2017/0063238 A1 | 3/2017 | Hang et al. |
| 2017/0279279 A1 | 9/2017 | Shimada et al. |
| 2018/0198361 A1 | 7/2018 | Seong et al. |
| 2018/0331618 A1* | 11/2018 | Engelhardt ........... H02M 3/157 |

* cited by examiner

RIPPLE VOLTAGE CONTROL CIRCUIT AND CONTROL METHOD THEREOF

RELATED APPLICATIONS

This application claims the benefit of Chinese Patent Application No. 202010284553.X, filed on Apr. 13, 2020, which is incorporated herein by reference in its entirety.

FIELD OF THE INVENTION

The present invention generally relates to the field of power electronics, and more particularly to ripple voltage control circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Among the control method for buck converters, the ripple voltage control method based on constant on-time (COT) control has become the preferred approach for high-current buck converters due to its relatively small output ripple under light load and superior dynamic performance. In this control method, the simulated ripple voltage of the inductor current is superimposed on a feedback voltage of the converter. An inverting input terminal of an error comparator may receive the superimposed signal, and a non-inverting input terminal of the error comparator may receive a reference signal. When the superimposed signal is lower than the reference signal, the output signal generated by the error comparator switches to be a high level. Then, the pulse-width modulation (PWM) trigger/flip-flop can be controlled to generate a turn-on signal for the upper transistor of the buck converter. The upper transistor of the buck converter can then be turned on for a constant on-time, and then turned off. Then, the lower transistor can be turned on until the output signal of the error comparator switches to be a high level again, thereby realizing a steady state.

Figure 1:
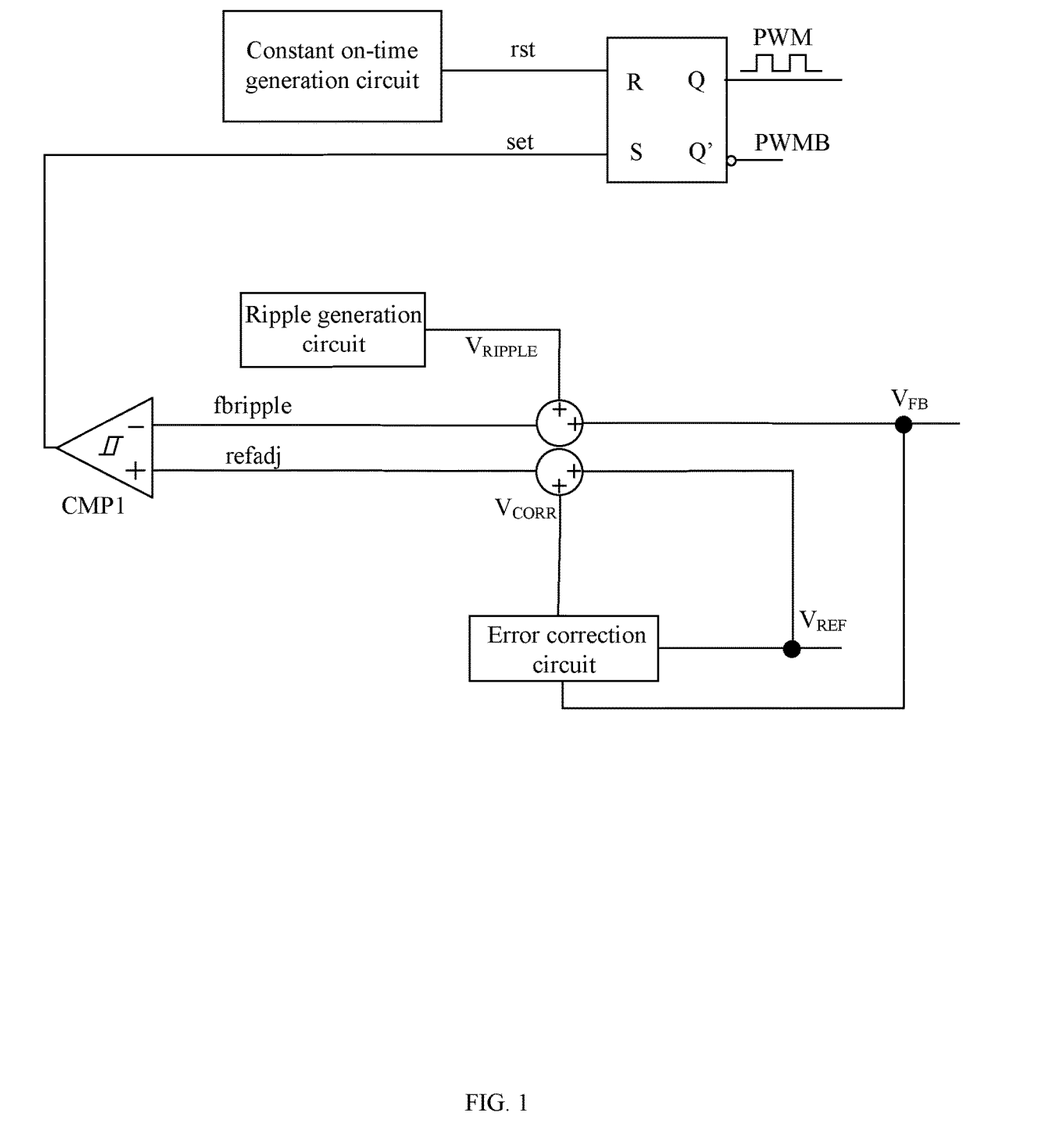
FIG. 1 is a schematic block diagram of an example ripple voltage control circuit based on constant on-time control.

Referring now to FIG. 1, shown is a schematic block diagram of an example ripple voltage control circuit based on COT control. In this particular example, a non-inverting input terminal of the error comparator may receive reference voltage $V_{REF}$, and an inverting input terminal of the error comparator may receive a superposition of ripple voltage $V_{RIPPLE}$ of the simulated inductor current and feedback voltage $V_{FB}$. In such a case, feedback voltage $V_{FB}$ may not be directly compared against reference voltage $V_{REF}$, such that feedback voltage $V_{FB}$ may not be equal to reference voltage $V_{REF}$ when the buck converter operates under the steady state without a steady-state error correction circuit. Moreover, feedback voltage $V_{FB}$ and reference voltage $V_{REF}$ can differ by a DC bias voltage. In order to eliminate the DC bias voltage resulting from ripple voltage $V_{RIPPLE}$, error correction signal $V_{CORR}$ generated by an error correction signal generation circuit can typically be superimposed on reference voltage $V_{REF}$.

For example, the error correction signal generation circuit can mainly include an error integrator, receiving feedback voltage $V_{FB}$ and reference voltage $V_{REF}$. If there is a deviation between feedback voltage $V_{FB}$ and reference voltage $V_{REF}$, the error integrator can be adjusted to generate an appropriate level, in order to obtain error correction signal $V_{CORR}$, and thereby eliminating the deviation by superimposing error correction signal $V_{CORR}$ on reference voltage $V_{REF}$. After the steady-state error is eliminated, error correction signal $V_{CORR}$ may be less than zero and equal to 50% of the peak-to-peak value of ripple voltage $V_{RIPPLE}$. In this example, there are actually two voltage loops. The voltage inner loop can quickly respond to the dynamic change of the load, and the voltage outer loop can eliminate steady-state error under the steady-state operation. The adjustment can be fast due to the voltage inner loop, while the adjustment can be slow due to the voltage outer loop, which is disadvantageous for fast dynamic performance.

Figure 2:
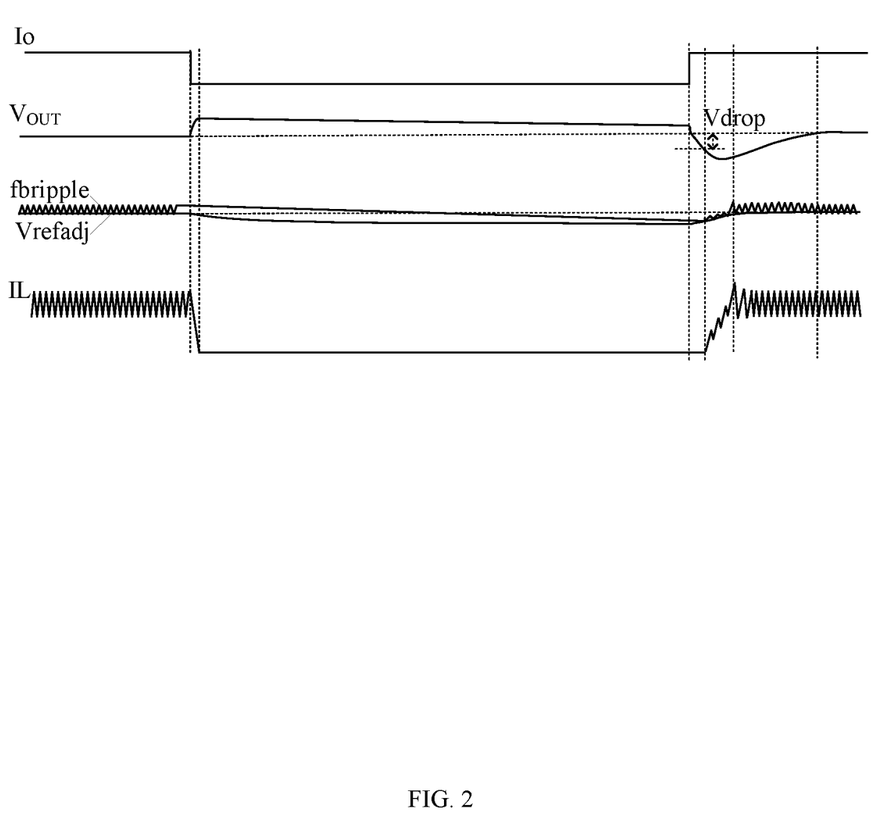
FIG. 2 is a waveform diagram of example operation of the ripple voltage control circuit based on constant on-time control.

Referring now to FIG. 2, shown is a waveform diagram of an example operation of the ripple voltage control circuit based on COT control. In this example, since output voltage $V_{OUT}$ rises highly after the heavy load turns to the no load, feedback voltage $V_{FB}$ may always be higher than reference voltage $V_{REF}$. Therefore, the error integrator always may operate in the reverse integration state, and correction signal $V_{CORR}$ can move in the negative direction. At this time, output current $I_{OUT}$ can make a rapid transition from the no load to the heavy load, correction signal $V_{CORR}$ may remain at a relatively low position at the moment of the load transition, and the adjustment of this voltage loop is relatively slow, resulting in a lack of recovery to a high position in a short time. Thus, output voltage $V_{OUT}$ can drop deeply. Vdrop as shown is the excess output voltage drop caused by the presence of correction signal $V_{CORR}$. In this way, the introduction of correction signal $V_{CORR}$ may have an adverse effect on the dynamic performance.

Figure 3:
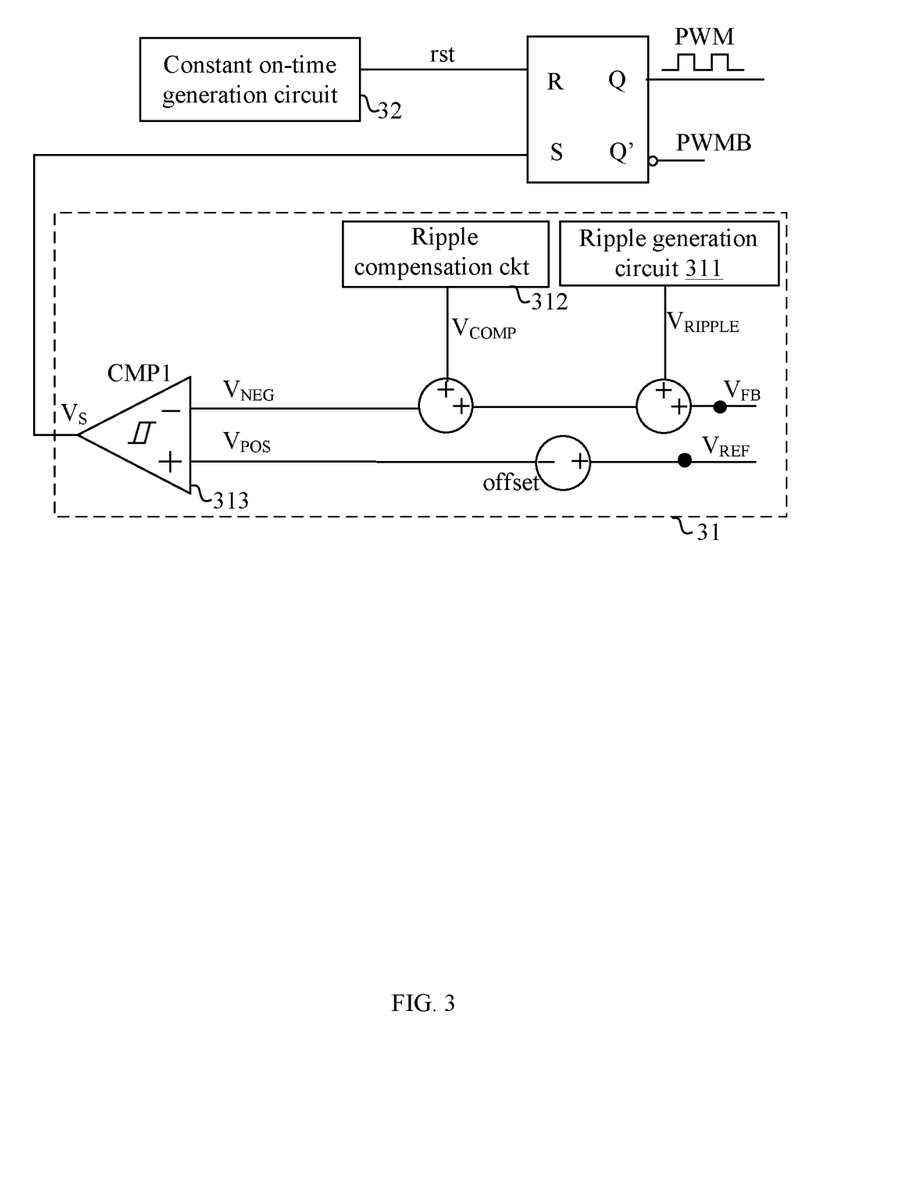
FIG. 3 is a schematic block diagram of an example ripple voltage control circuit, in accordance with embodiments of the present invention.

Referring now to FIG. 3, shown is a schematic block diagram of an example ripple voltage control circuit, in accordance with embodiments of the present invention. In this particular example, the ripple voltage control circuit can include control circuit 31 and constant on-time generation circuit 32. Control circuit 31 can generate ripple signal $V_{NEG}$ by superimposing ripple voltage $V_{RIPPLE}$ and compensation voltage $V_{COMP}$ on feedback voltage $V_{FB}$ that represents output voltage $V_{OUT}$ of the switching converter. Reference signal $V_{POS}$ can be generated by superimposing bias voltage offset on reference voltage $V_{REF}$. Ripple signal $V_{NEG}$ can be compared against reference signal $V_{POS}$ in order to generate turn-on signal Vs for the main power switch of the switching converter. For example, control circuit 31 can include ripple generation circuit 311 for generating ripple voltage $V_{RIPPLE}$, and ripple compensation circuit 312 for generating compensation voltage $V_{COMP}$.

Compensation voltage $V_{COMP}$ may adaptively vary with duty cycle D of the main power switch, such that ripple signal $V_{NEG}$ is independent of duty cycle D and the trough of ripple signal $V_{NEG}$ is also independent of duty cycle D. Control circuit 31 can also include comparison circuit 313, which can include comparator CMP1. For example, a non-inverting terminal and an inverting terminal of comparator CMP1 may respectively receive reference signal $V_{POS}$ and ripple signal $V_{NEG}$, and an output terminal of comparator CMP1 can generate turn-on signal Vs. Constant on-time generation circuit 32 can compare on-time reference signal $V_2$ against ramp signal Vramp in order to generate turn-off signal rst to turn off the main power switch.

In particular embodiments, the peak-to-peak value of ripple voltage $V_{RIPPLE}$ can be determined when the switching converter operates in the steady state with a certain/predetermined duty cycle based on COT control. Moreover, the peak-to-peak value of ripple voltage $V_{RIPPLE}$ can be calculated with the variation curve of the duty cycle (e.g., in a linear relationship therewith). For example, the adaptive compensation voltage $V_{COMP}$ can also be superimposed on the superimposed voltage of ripple voltage $V_{RIPPLE}$ and feedback voltage $V_{FB}$, thereby generating ripple signal $V_{NEG}$. When switching mode converter operates with different duty cycles or different output voltages, the valley of ripple signal $V_{NEG}$ can be maintained at the same horizontal line. That is, the valley value of ripple signal $V_{NEG}$ can be maintained at the same threshold under different duty cycles or different voltages. In this way, it can be realized that feedback voltage $V_{FB}$ is equal to reference voltage $V_{REF}$ by superimposing bias voltage offset on reference voltage $V_{REF}$ without an error correction circuit.

Figure 4:
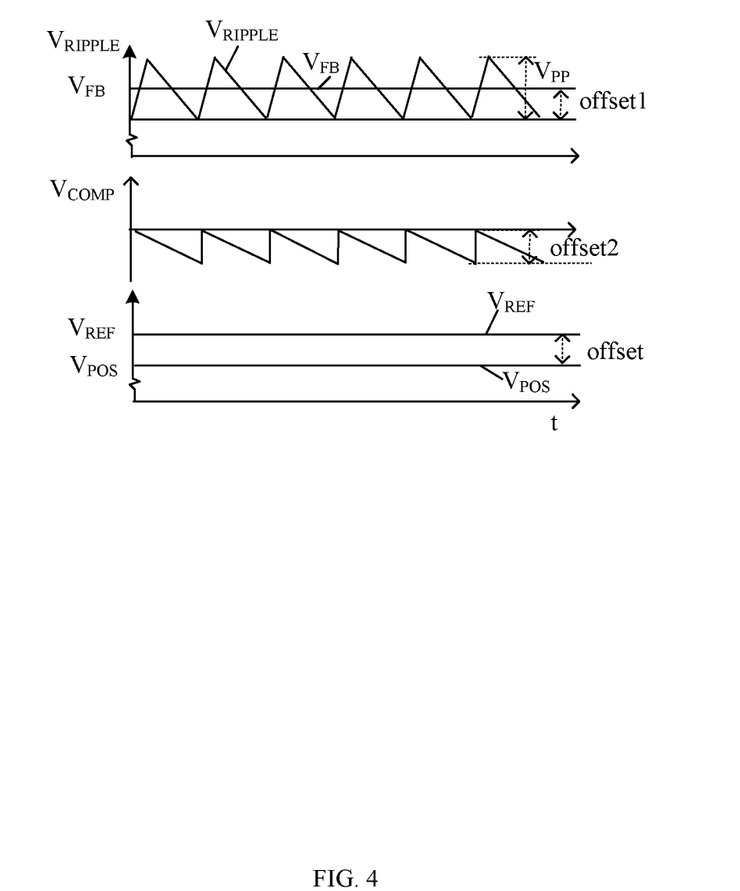
FIG. 4 is a waveform diagram of a first example operation of the ripple voltage control circuit, in accordance with embodiments of the present invention.

Referring now to FIG. 4, shown is a waveform diagram of a first example operation of the ripple voltage control circuit in accordance with embodiments of the present invention. In this particular example, bias voltage offset1 is half of the peak-to-peak value of ripple voltage $V_{RIPPLE}$. That is: offset1=Vpp/2, and bias voltage offset2 is the peak-to-peak value of compensation voltage $V_{COMP}$. In order to maintain feedback voltage $V_{FB}$ as equal to reference voltage $V_{REF}$, the sum of bias voltages offset1 and offset2 should be equal to bias voltage offset; that is: offset1+offset2=offset. In order to calculate the value of compensation voltage $V_{COMP}$ that is to be superimposed, the relationship between peak-to-peak value Vpp of ripple voltage $V_{RIPPLE}$, output voltage Vout, and duty cycle D is derived.

Figure 5:
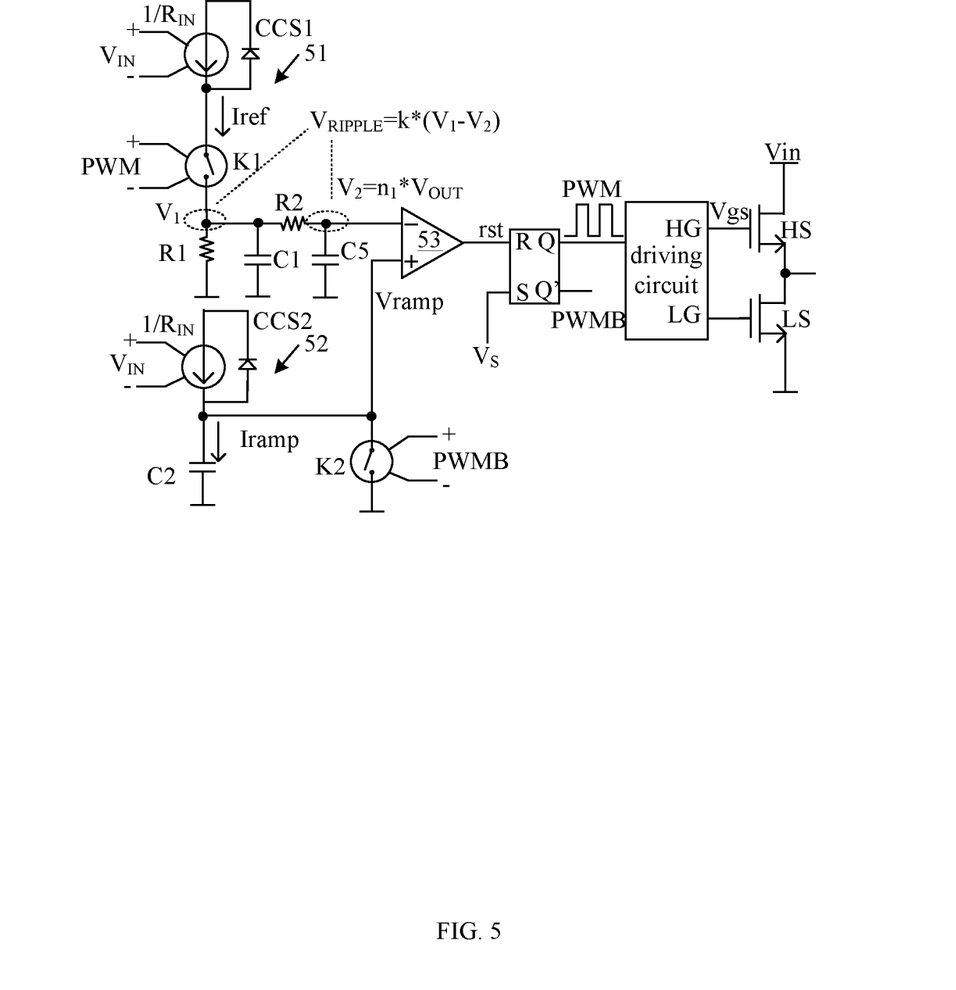
FIG. 5 is a schematic diagram of an example constant on-time generation circuit, in accordance with embodiments of the present invention.

Referring now to FIG. 5, shown is a schematic diagram of an example constant on-time generation circuit, in accordance with embodiments of the present invention. In this particular example, some node voltages in the constant on-time generation circuit can be used to generate ripple voltage $V_{RIPPLE}$. In this particular example, a buck converter is utilized, main power switch HS and rectifier power switch LS are shown, and inductors and capacitors of the power stage circuit are not shown. Constant on-time generation circuit 32 can include reference signal generation circuit 51, ramp signal generation circuit 52, and comparator 53. For example, reference signal generation circuit 51 can include controlled current source CCS1, switch K1, resistor R1, and a filter circuit with a relatively large RC time constant.

Controlled current source CCS1 can be controlled by input voltage $V_{IN}$, and may generate current Iref that is proportional to input voltage $V_{IN}$. Switch K1 can be controlled by signal PWM to be turned on and off synchronously with main power switch HS. Resistor R1 can connect between switch K1 and ground. The filter circuit can be configured as a "π"-shaped RC filter circuit including capacitor C1, resistor R2, and capacitor C5. Here, in constant on-time generation circuit 32, current Iref may flow through resistor R1 under the control of switch K1 forming a voltage drop. Further, the filter circuit can average signal $V_1$ across resistor R1, and may generate the average value of signal $V_1$ (e.g., on-time reference signal V2). For example, on-time reference signal $V_2$ is equal to n1 times of output voltage $V_{OUT}$ (e.g., $V_2=n_1 \cdot V_{OUT}$), and n1 is the coefficient. Ramp signal generation circuit 52 can include controlled current source CCS2, switch K2, and capacitor C2. For example, controlled current source CCS2 can be controlled by input voltage $V_{IN}$, and may generate current Tramp that is proportional to input voltage $V_{IN}$.

Capacitor C2 and switch K2 can connect in parallel between the output terminal of controlled current source CCS2 and ground, and switch K2 can be controlled by signal PWMB to be turned on and off in the opposite way as main power switch HS. When main power switch HS is turned on, switch K1 can be turned on, and switch K2 turned off. When main power switch HS is turned off, switch K1 can be turned off, and switch K2 turned on. When switch K2 is turned off, capacitor C2 may be charged by current Iramp, such that ramp signal Vramp rises linearly. When switch K2 is turned on, capacitor C2 may be short-circuited and discharged, such that ramp signal Vramp quickly drops to zero and maintains at zero until switch K2 is turned off again. Thus, ramp signal Vramp may have a ramp-shaped waveform. Moreover, comparator 53 can compare on-time reference signal $V_2$ against ramp signal Vramp, and may generate turn-off signal rst for the main power switch. When the buck converter operates in the steady state, the charging and discharging of capacitor C2 establishes ampere-second balance. Moreover, signal $V_1$ across resistor R1 can essentially be a stable triangular wave, and the phase of signal $V_1$ can be the same as that of the inductor current. After being filtered by the filter circuit with a large RC time constant, on-time reference signal $V_2$ (e.g., the average value of voltage $V_1$) can be obtained.

Figure 6:
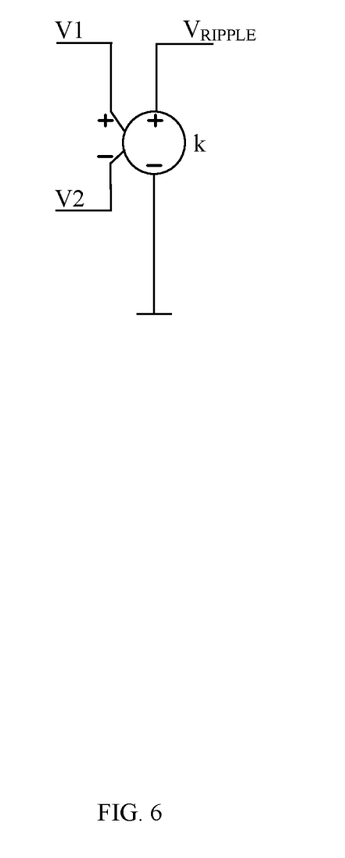
FIG. 6 is a schematic diagram of an example ripple generation circuit, in accordance with embodiments of the present invention.

Referring now to FIG. 6, shown is a schematic diagram of an example ripple generation circuit in accordance with embodiments of the present invention. In particular embodiments, the ripple generation circuit can include a voltage-controlled voltage source. The voltage-controlled voltage source can receive signal V1 and on-time reference signal V2, and may generate ripple voltage $V_{RIPPLE}$. For example, ripple voltage $V_{RIPPLE}$ may be proportional to the difference between signal V1 and on-time reference signal V2. That is, $V_{RIPPLE}=k*(V_1-V_2)$, and k is the proportional coefficient. The following formulas can be obtained as shown below in (1) and (2).

$$V_2 = \frac{V_{IN}}{R_{IN}} * R1 * D = n_1 * V_{OUT} \quad (1)$$

$$\frac{V_{PP}}{2} = \frac{k*T_{SW}}{2*R_{IN}*C_1} * V_{OUT}*(1-D) = m*V_{OUT}*(1-D) \quad (2)$$

Here, $T_{SW}$ is the switching cycle. It can be seen that $V_{PP}/2$ (e.g., bias voltage offset 1) as a roughly linear relationship with duty cycle D, and its slope is related to output voltage $V_{OUT}$. In order to eliminate the influence by the change of duty cycle D, compensation voltage $V_{COMP}$ should meet the following formula (3).

$$V_{COMP}=m*V_{OUT}*D \quad (3)$$

Thus, compensation voltage $V_{COMP}$ should be proportional to duty cycle D and also proportional to output voltage $V_{OUT}$. For example, compensation voltage $V_{COMP}$ should be proportional to the product of output voltage $V_{OUT}$ and duty cycle D. As discussed above, the ripple compensation circuit can generate compensation voltage $V_{COMP}$ by constructing the information of $V_{OUT}*D$, and then scaling by m times.

Figure 7:
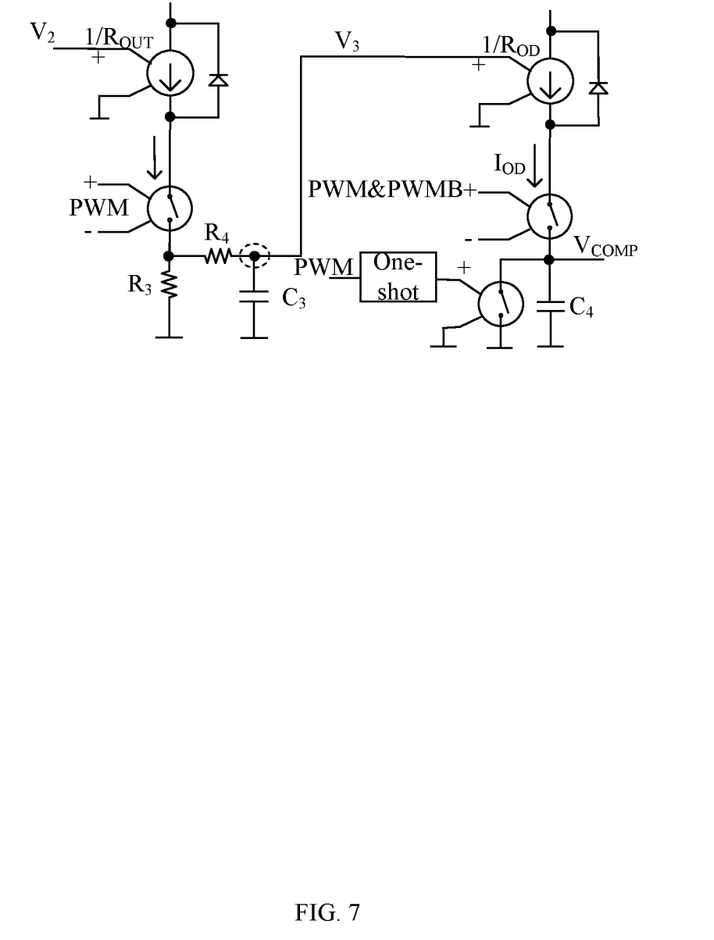
FIG. 7 is a schematic diagram of an example ripple compensation circuit, in accordance with embodiments of the present invention.

Referring now to FIG. 7, shown is a schematic diagram of an example ripple compensation circuit in accordance with embodiments of the present invention. In particular embodiments, on-time reference signal $V_2$ that represents the information of output voltage $V_{OUT}$ is shown in constant on-time generation circuit 32. For example, the ripple compensation circuit can include a current source controlled by on-time reference signal $V_2$. The ripple compensation circuit can also include a switch controlled by signal PWM and connected in series with the current source. The ripple compensation circuit can also include a filter circuit, including resistor $R_4$ and capacitor $C_3$, and connected to the switch and that can generate signal $V_3$ that represents the information of $V_{OUT}*D$ (e.g., a product of the output voltage and the duty cycle).

The ripple compensation circuit can also include a compensation voltage generation circuit that generates compensation voltage $V_{COMP}$ according to signal $V_3$. For example, the compensation signal generation circuit can include a current source controlled by signal $V_3$. The compensation signal generation circuit can also include a switch controlled by signal PWM and signal PWMB and connected with the current source controlled by signal $V_3$. The compensation signal generation circuit can also include capacitor $C_4$ charged by current $I_{OD}$ that is generated by the current source controlled by signal $V_3$, and a switch controlled by a pulse generated at the rising-edge of signal PWM. For example, compensation voltage $V_{COMP}$ can be formed across capacitor $C_4$, and the switching converter may operate on the continuous conduction mode (CCM), such that compensation voltage $V_{COMP}$ is a sawtooth wave signal. As discussed above, the following formulas (4) and (5) can be obtained as shown.

$$V_3 = V_2 * \frac{1}{R_{OUT}} * R_3 * D = n_1 * \frac{1}{R_{OUT}} * R_3 * V_{OUT} * D = n_2 * V_{OUT} * D \quad (4)$$

$$V_{COMP} = V_3 * \frac{1}{R_{OD}} * \frac{T_{SW}}{C_4} = n_3 * V_{OUT} * D \quad (5)$$

When coefficient n3 is set to be m, the following formula (6) can be obtained.

$$V_{COMP}=m*V_{OUT}*D \quad (6)$$

In particular embodiments, new circuit parameters can be constructed and realized by utilizing existing circuit parameters, such that the circuit can be simplified. In order to maintain feedback voltage $V_{FB}$ as equal to reference voltage $V_{REF}$, the following formula (7) should be met.

$$\text{offset} = \text{offset1} + \text{offset2} = \frac{V_{PP}}{2} + V_{COMP} = m*V_{OUT} \quad (7)$$

Therefore, a fixed bias voltage offset is received by the input terminal of comparator CMP1, with a value of $m*V_{OUT}$, thereby realizing a design without an error correction circuit. Since bias voltage offset is proportional to output voltage $V_{OUT}$ and on-time reference signal $V_2$ that represents information of output voltage $V_{OUT}$ exists in the constant on-time circuit 32, bias voltage offset can be set as proportional to on-time reference voltage $V_2$, such that the bias voltage offset that meets the requirements can be obtained by a simple circuit.

Figure 8:
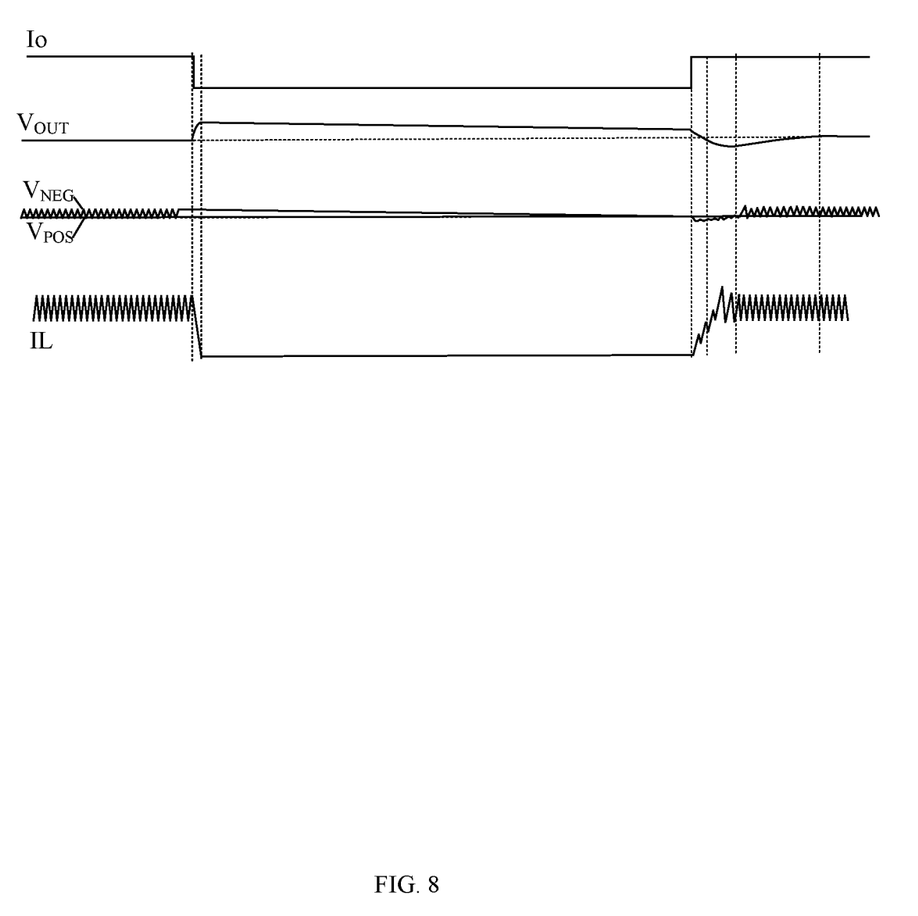
FIG. 8 is a waveform diagram of a second example operation of the ripple voltage control circuit, in accordance with embodiments of the present invention.

Referring now to FIG. 8, shown is a waveform diagram of a second example operation of the ripple voltage control circuit, in accordance with embodiments of the present invention. In this particular example, when the switching converter operates with a certain duty cycle in the steady state at a certain output voltage $V_{OUT}$, compensation voltage $V_{COMP}$ can be determined by ripple compensation circuit 312. Then, the determined compensation voltage $V_{COMP}$ and ripple voltage $V_{RIPPLE}$ may be superimposed on feedback voltage $V_{FB}$ to generate ripple signal $V_{NEG}$. Moreover, bias voltage offset can be superimposed on reference voltage $V_{REF}$ as reference signal $V_{POS}$. Further, ripple signal $V_{NEG}$ can be compared against reference signal $V_{POS}$, in order to generate turn-on signal Vs for the main power switch of the switching converter.

With appropriate design, the valley value of ripple signal $V_{NEG}$ can be maintained at a certain threshold with ripple voltage $V_{RIPPLE}$ and compensation voltage $V_{COMP}$, such that bias voltage offset superimposed on reference voltage $V_{REF}$ can be offset. In such a case, it can be realized that feedback voltage $V_{FB}$ is maintained as equal to reference voltage $V_{REF}$ when the switching converter operates with different duty cycles without an error correction circuit. Since the error correction circuit is not applied in the ripple voltage control circuit, the dynamic performance can be greatly improved when the load changes.

It can be understood that the peak-to-peak value of ripple voltage $V_{RIPPLE}$ increases as the duty cycle decreases. Therefore, the clamp value of the error correction circuit may be selected the maximum peak-to-peak value of ripple voltage $V_{RIPPLE}$. However, such a large clamp value can be excessive for the switching converter with a large duty cycle. In particular embodiments, compensation voltage $V_{COMP}$ may adaptively vary along with duty cycle D of the main power switch, such that ripple signal $V_{NEG}$ is independent of duty cycle D and the valley value of ripple signal $V_{NEG}$ is also independent of duty cycle D. as such, the difficulty of setting the peak-to-peak value of ripple voltage $V_{RIPPLE}$ under a full duty cycle can be reduced and the stability can be improved under a large duty cycle when the peak-to-peak value of ripple voltage $V_{RIPPLE}$ is too small. For example, an error correction loop with a very narrow clamp value can also be kept in order to compensate for the error caused by the intermediate parameter transfer and the ripple of feedback voltage $V_{FB}$ itself.

Figure 9:
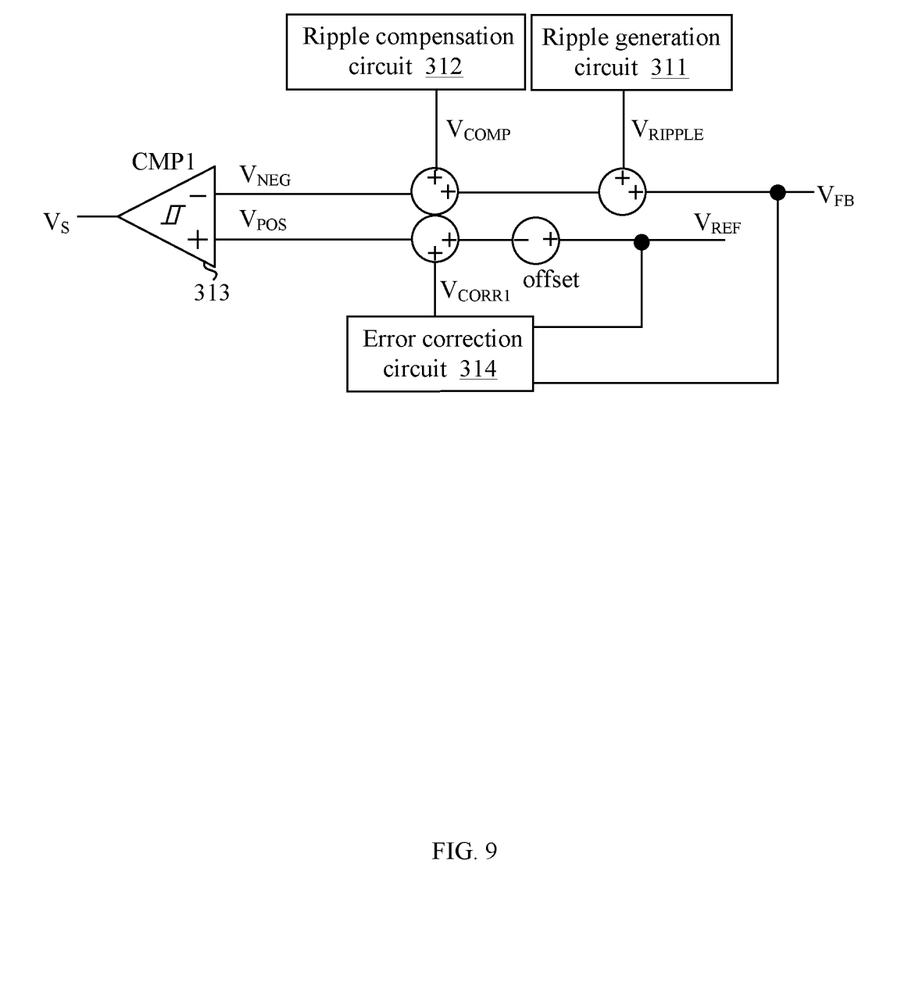
FIG. 9 is a schematic block diagram of another example ripple voltage control circuit, in accordance with embodiments of the present invention.

Referring now to FIG. 9, shown is a schematic block diagram of another example ripple voltage control circuit, in accordance with embodiments of the present invention. In this particular example, error correction circuit 314 can be applied in the ripple voltage control circuit. Error correction circuit 314 can substantially eliminate the steady-state error of the output voltage caused by the ripple of feedback voltage $V_{FB}$. For example, error correction circuit 314 can generate error correction signal $V_{CORR1}$ according to feedback voltage $V_{FB}$ and reference voltage $V_{REF}$. Then, bias voltage offset and error correction signal $V_{CORR1}$ can be superimposed on reference voltage $V_{REF}$ as reference signal $V_{POS}$. Since the clamping value of the error correction circuit no longer needs to be set according to the maximum peak-to-peak value of ripple voltage $V_{RIPPLE}$, the clamping value can be relatively small in this case.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A ripple voltage control circuit for controlling a switching converter, the ripple voltage control circuit comprising:
   a) a control circuit configured to superimpose a compensation voltage and a first ripple voltage on a feedback voltage that represents an output voltage of the switching converter, in order to generate a ripple signal;
   b) the control circuit being configured to superimpose a bias voltage on a reference voltage that represents a desired output voltage of the switching converter as a reference signal, and to compare the ripple signal against the reference signal in order to generate a turn-on signal for a main power switch of the switching converter; and
   c) wherein the compensation voltage adaptively varies with a duty cycle of the main power switch, such that the ripple signal is independent of the duty cycle, in order to maintain the feedback voltage as equal to the reference voltage.

2. The ripple voltage control circuit of claim 1, wherein the compensation voltage adaptively varies with the duty cycle of the main power switch, such that a valley value of the ripple signal is independent of the duty cycle.

3. The ripple voltage control circuit of claim 1, wherein the compensation voltage is proportional to the duty cycle.

4. The ripple voltage control circuit of claim 3, wherein the compensation voltage is proportional to the output voltage of the switching converter.

5. The ripple voltage control circuit of claim 1, wherein the bias voltage is proportional to the output voltage of the switching converter.

6. The ripple voltage control circuit of claim 1, wherein a peak-to-peak value of the first ripple voltage and the duty cycle change in the opposite direction in a linear relationship.

7. The ripple voltage control circuit of claim 1, further comprising a constant on-time generation circuit configured to compare an on-time reference signal against a ramp signal, in order to generate a turn-off signal for the main power switch of the switching converter.

8. The ripple voltage control circuit of claim 7, wherein the on-time reference signal is proportional to the bias voltage.

9. The ripple voltage control circuit of claim 7, wherein:
   a) the constant on-time generation circuit comprises a first node that generates a triangular wave signal and a second node that generates the on-time reference signal; and
   b) the first ripple voltage is proportional to a difference between the triangular wave signal and the on-time reference signal.

10. The ripple voltage control circuit of claim 1, further comprising an error correction circuit configured to eliminate a steady-state error for the output voltage of the switching converter caused by compensating a ripple of the feedback voltage.

11. The ripple voltage control circuit of claim 10, wherein:
    a) the error correction circuit is configured to generate an error correction signal according to a difference between the feedback voltage and the reference voltage; and
    b) the bias voltage and the error correction signal are superimposed on the reference voltage to form the reference signal.

12. The ripple voltage control circuit of claim 7, further comprising a ripple compensation circuit configured to generate the compensation voltage according to the on-time reference signal and the duty cycle.

13. The ripple voltage control circuit of claim 7, wherein the ripple compensation circuit comprises:
    a) a current source controlled by the on-time reference signal;
    b) a switch controlled by a pulse-width modulation (PWM) signal and coupled in series with the current source;
    c) a filter circuit coupled to the switch and being configured to generate a third signal that represents a product of the output voltage and the duty cycle; and
    d) a compensation signal generation circuit configured to perform a proportional operation on the third signal to obtain the compensation voltage.

14. A method of controlling a switching converter, the method comprising:
    a) generating a ripple signal by superimposing a compensation voltage and a first ripple voltage on a feedback voltage representing an output voltage of the switching converter;
    b) generating a reference signal by superimposing a bias voltage on a reference voltage representing a desired output voltage of the switching converter;
    c) comparing the ripple signal against the reference signal to generate a turn-on signal for a main power switch of the switching converter; and
    d) wherein the compensation voltage adaptively varies with a duty cycle of the main power switch, such that the ripple signal is independent of the duty cycle, in order to maintain the feedback voltage as equal to the reference voltage.

15. The method of claim 14, wherein the compensation voltage adaptively varies with the duty cycle of the main power switch, such that a valley value of the ripple signal is independent of the duty cycle.

16. The method of claim 14, wherein the compensation voltage is proportional to the duty cycle.

17. The method of claim 16, wherein the compensation voltage is proportional to the output voltage of the switching converter.

18. The method of claim 14, wherein the bias voltage is proportional to the output voltage of the switching converter.

* * * * *